United States Patent
Chu

(10) Patent No.: US 6,765,317 B2
(45) Date of Patent: Jul. 20, 2004

(54) POWER SUPPLY MODULE FOR ELECTRICAL POWER TOOLS

(75) Inventor: Raymond Wai Hang Chu, Chai Wan (HK)

(73) Assignee: Defond Manufacturing Limited, Chai Wan (HK)

( * ) Notice: Subject to any disclaimer, the term of this patent is extended or adjusted under 35 U.S.C. 154(b) by 231 days.

(21) Appl. No.: 10/112,863

(22) Filed: Apr. 2, 2002

(65) Prior Publication Data

US 2003/0184161 A1 Oct. 2, 2003

(51) Int. Cl.[7] .......................... H02J 7/00; H01M 10/46
(52) U.S. Cl. .................................... 307/150; 320/114
(58) Field of Search ........................ 307/80, 131, 150; 320/107, 110, 114

(56) References Cited

U.S. PATENT DOCUMENTS

| | | | | |
|---|---|---|---|---|
| 5,579,197 A | * | 11/1996 | Mengelt et al. | 361/93.4 |
| 5,600,247 A | * | 2/1997 | Matthews | 324/426 |
| 5,715,156 A | * | 2/1998 | Yilmaz et al. | 363/142 |
| 6,566,843 B2 | * | 5/2003 | Takano et al. | 320/114 |
| 6,573,621 B2 | * | 6/2003 | Neumann | 307/150 |
| 6,675,912 B2 | * | 1/2004 | Carrier | 173/217 |

* cited by examiner

Primary Examiner—Adolf Berhane
(74) Attorney, Agent, or Firm—Leydig, Voit & Mayer, Ltd.

(57) ABSTRACT

A power supply module for use between an AC/DC power supply unit and an electrical power tool driven by an electric motor and powered by a rechargeable battery pack which has a normal operating voltage and a higher fully-charged terminal voltage. The module includes an input connectable to the supply unit and an output connectable in parallel to the battery pack, and an operating circuit for delivering DC power from the supply unit to the tool in parallel with the battery pack. The operating circuit provides a DC operating voltage at the output of a value between the normal operating voltage and the fully-charged terminal voltage of the battery pack, and provides an output current limited to a predetermined value. The circuit has a comparator for determining whether the output current is less than or is increasing toward exceeding the predetermined value provides a corresponding control signal. The circuit includes a switching device for controlling, in response to the control signal, the power delivered to the tool as a direct DC current when the output current is below the predetermined value or as a pulsating DC current when the output current is increasing toward exceeding the predetermined value.

15 Claims, 9 Drawing Sheets

… …

POWER SUPPLY MODULE FOR ELECTRICAL POWER TOOLS

The present invention relates to a power supply module for supplying power to an electrical power tool that is driven by an electric motor and powered by a rechargeable battery pack.

BACKGROUND OF THE INVENTION

The battery packs for most, if not all, of the battery-operated power tools available on the market have a limited capacity that restricts the operating time of the tools to about half an hour per pack for normal use. Recharging of the battery pack by a battery charger will take at least an hour for quick charge and up to several hours for normal charge, which is time consuming. A spare battery pack may be used in the meantime, but it can be an expensive investment and is not environment friendly. One or more fully recharged batteries may be prepared for future use, but they have a tendency to leak or self-discharge when stored for a prolonged period of time.

The subject invention seeks to mitigate or at least alleviate such problems by providing a power supply module for supplying power to an electrical power tool in conjunction with a rechargeable battery pack therefor.

SUMMARY OF THE INVENTION

According to the invention, there is provided a power supply module for use between an AC/DC power supply unit and an electrical power tool driven by an electric motor and powered by a rechargeable battery pack that has a normal operating voltage and a relatively higher fully-charged terminal voltage. The module comprises an input connectable to the power supply unit and an output connectable in parallel to the battery pack, and an operating circuitry connected between the input and the output for delivering DC power from the power supply unit to the power tool in parallel with the battery pack supplying DC power to the power tool. The operating circuitry provides a DC operating voltage at the output of a value between the normal operating voltage and the fully-charged terminal voltage of the battery pack, and provides an output current limited to a predetermined magnitude. The operating circuitry comprises a current comparator for determining whether the output current is less than or has a tendency exceeding the predetermined magnitude and then providing a corresponding control signal. The operating circuitry includes a switching device connected at the output for controlling, in response to the control signal, the power delivered to the power tool in an interactive manner as a direct DC current when the output current is below the predetermined magnitude or as a pulsating DC current when the output current has a tendency exceeding the predetermined magnitude.

Preferably, the operating circuitry includes a current sensor connected between the input and the current comparator for sensing the current drawn into and output by the module and then sending a control signal indicative of the magnitude of the output current to the current comparator, and the current comparator is for subsequently comparing the control signal with a predetermined value that represents the predetermined magnitude.

More preferably, the operating circuitry includes an oscillator connected between the current comparator for receiving the control signal therefrom and the switching device for providing a trigger signal thereto for controlling, in response to the control signal, the power delivered to said power tool in the interactive manner.

Further more preferably, the trigger signal provided by the oscillator is of a frequency below 1 kHz.

Further more preferably, the current comparator is arranged also to determine the rate at which the output current tends to exceed the predetermined magnitude and, in response, to control the oscillator to provide a trigger signal for switching the switching device at a frequency that increases or decreases with the rate of increase of the output current.

It is preferred that the operating circuitry provides a substantially constant DC operating voltage at the output.

It is preferred that the DC operating voltage provided by the operating circuitry is 25% higher than the normal operating voltage of said battery pack.

It is further preferred that the DC operating voltage provided by the operating circuitry is substantially 10% higher than the normal operating voltage of said battery pack.

In a preferred embodiment, the current comparator is arranged such that its control signal controls the switching device to deliver power to said power tool as a pulsating DC current whose peak magnitude is maintained substantially at the predetermined magnitude.

Advantageously, the operating circuitry includes a delay element to delay the control signal turning on the switching device in each cycle while delivering power to said power tool as a pulsating DC current.

It is preferred that the current comparator is arranged such that its control signal turns on the switching device continuously that in turn delivers substantially the whole of the current supplied by said power supply unit to said power tool as a direct DC current via a conducting path.

The invention also provides an electrical power tool driven by an electric motor and powered by a rechargeable battery pack, incorporating the aforesaid power supply module. The power tool includes a trigger control circuit connected between the battery pack and the motor, which incorporates a trigger for switching on and off and controlling the speed of the motor. The module is connected at its output in parallel with the battery pack and acts as an auxiliary power source to assist the battery pack.

The invention also provides an AC/DC power supply unit incorporating the aforesaid power supply module. The power supply unit is an AC-to-DC switching mode power supply having an output connected to the input of the module for supplying a DC power to the module. The power supply unit and the module have substantially the same operating voltage.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
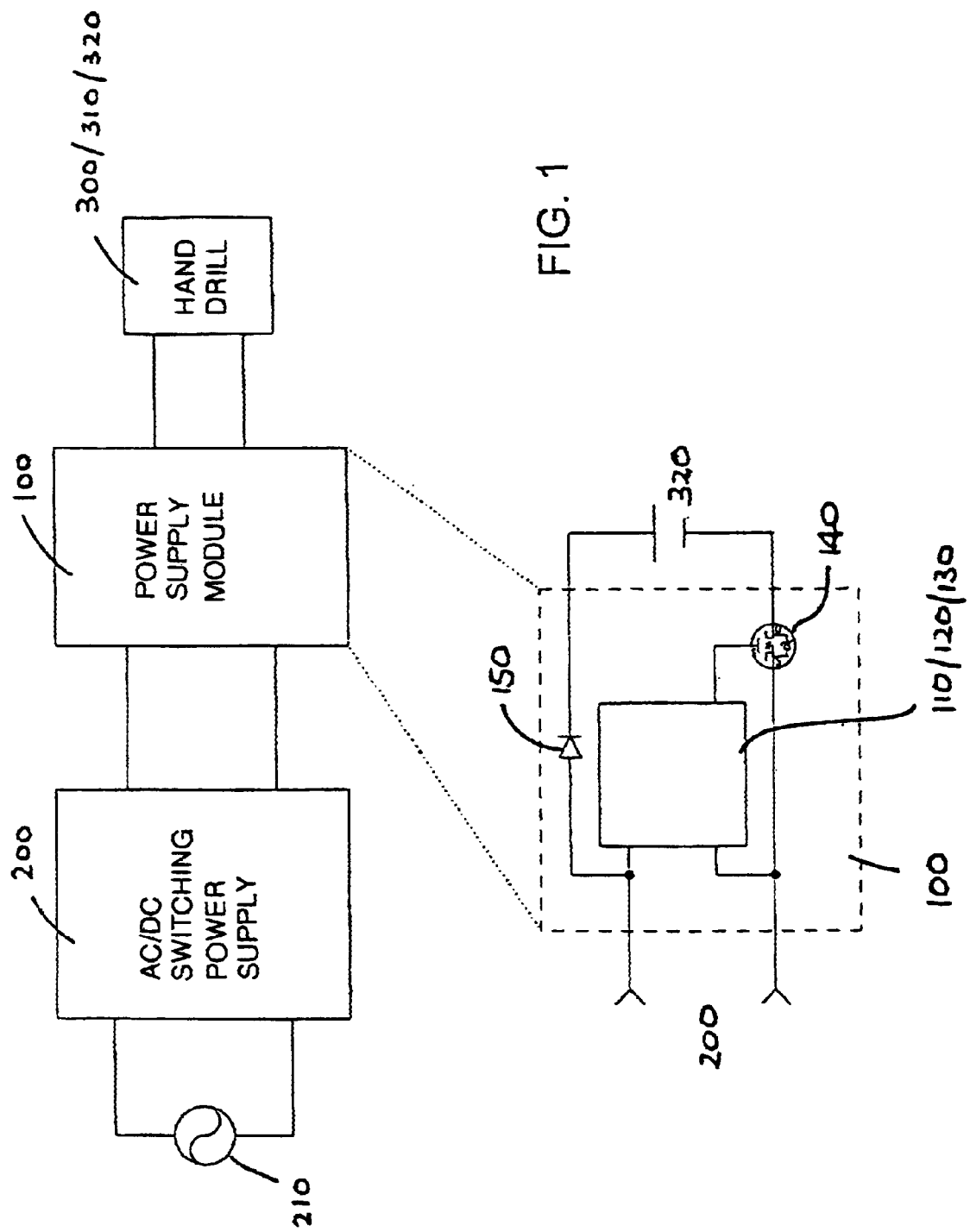
FIG. 1 is a schematic block diagram showing the use of an embodiment of an power supply module in accordance with the invention between an AC/DC power supply unit and a power tool.
Figure 2:
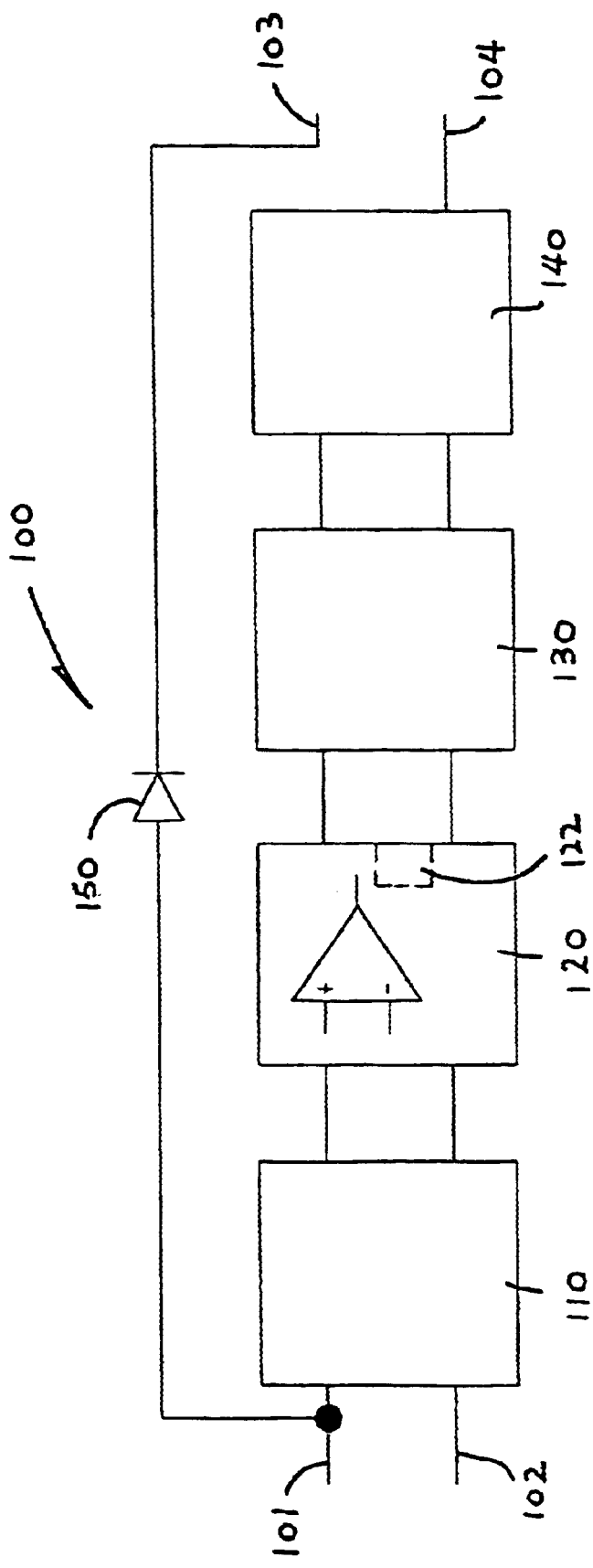
FIG. 2 is a functional block diagram of the power supply module of FIG. 1.
Figure 3:
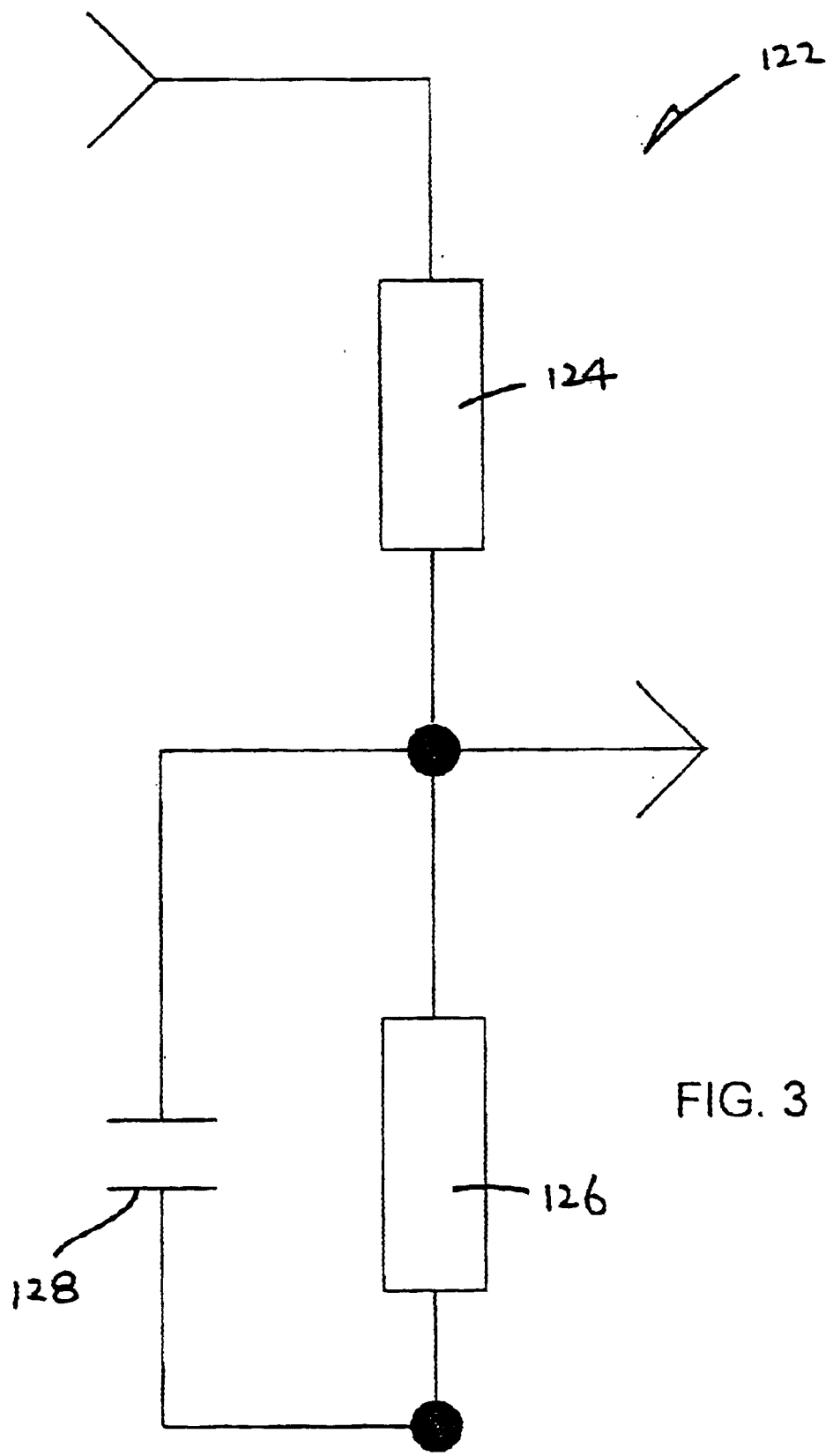
FIG. 3 is a circuit diagram of a delay element of the power supply module of FIG. 2.

Referring initially to FIGS. 1 to 4B of the drawings, there is shown a power supply module 100 embodying the invention for use between an AC/DC switching power supply unit 200 and an electrical power tool 300. The electrical power tool 300 is an electric hand drill 300, for example, that is driven by an electric motor 310 and powered by a rechargeable NiCd DC battery pack 320 having a normal operating voltage of say 9.6V. The battery pack 320 has a maximum terminal voltage of up to say 13.0V, depending on its design, when it is fully charged. The power supply unit 200, which is constructed in a manner as generally known in the art, converts the AC voltage of a mains power source 210 into a lower DC voltage of 10.5V.

The power supply module 100 has a substantially constant DC output voltage of about 10.5V, which is the same as that of the power supply unit 200. This output voltage is chosen to be higher than the normal operating voltage of the battery pack 320 but below its maximum terminal voltage in the fully charged condition, i.e. a value between the normal battery operating voltage of 9.6V and the maximum battery terminal voltage of 13.0V. In general, the output voltage of the power supply module 100 is determined to be at most 25%, and preferably about 10%, higher than the normal operating voltage of the battery pack 320.

The power supply module 100 has a pair of input terminals 101/102 and a pair of output terminals 103/104, and includes a series of operating circuits 110 to 140 connected between the input terminals 101/102 and the output terminals 103/104. The power supply module 100 controls the DC power supplied by the power supply unit 200, with its input terminals 101/102 connected to respective output terminals of the latter. The power supply module 100 then delivers the supplied power, in a controlled manner, to the electric drill 300 by having its output terminals 103/104 connected to respective terminals of the battery pack 320.

As is generally known in the art, the battery pack 320 is connected to the motor 310 via a control circuit 330 incorporating a trigger 340 (FIG. 5) for switching on and off and controlling the speed of the motor 310. The power supply module 100 is connected at its output in parallel with the battery pack 320, and acts as an auxiliary power source to supplement the battery pack 320 depending on the battery and load conditions. The output current delivered by the power supply module 100 is limited to a predetermined maximum magnitude of at least 3A, or specifically 5A in the case of the described embodiment.

The operating circuits comprise a current sensor 110 connected to both input terminals 101/102, a current comparator 120 connected to the current sensor 110, a lower frequency oscillator 130 connected to the current comparator 120, and a switching device 140 connected from the oscillator 130 to the second output terminal 104.

A unidirectional conducting element, such as a diode 150, is connected in its forward conducting direction from the first input terminal 101 to the first output terminal 103. The diode 150 serves to block the reverse of current flow that may otherwise occur when the terminal voltage of the battery pack 320 is higher than the output voltage of the power supply module 100, particularly when the battery pack 320 is fully charged.

In addition, the diode 150 acts as a DC block that protects the power supply module 100 and/or the power supply unit 200 when one of the following situations occurs. First, if the mains power source 210 is not connected or in the absence of any power output from it to the power supply unit 200, a reverse current will flow from the battery pack 320 into the power supply module 100 and the power supply unit 200. Such a reverse current will not only drain the battery pack 320 but may also damage the power supply module 100 and unit 200. Second, if the power supply unit 200 is not connected, there will be a reverse current flowing from battery pack 320 to the power supply module 100, resulting in the power supply module 100 consuming and wasting the battery power. In all, the diode 150 acts as a DC block that prevents any reverse flow of current.

The current sensor 110 senses the current drawn into and output by the power supply module 100 and then sends a control signal indicative of the magnitude of the output current to the current comparator 120. The current comparator 120 subsequently compares the control signal with a predetermined value that represents the maximum output current of 5A, and then controls the oscillator 130 accordingly, which in turn provides a trigger signal to the switching device 140. The switching device 140 can be any suitable solid-state switch such as a MOSFET transistor, and serves to enable and/or disable the power delivered to the load, i.e. the electric drill 300 or its motor 310.

Depending on the load condition as detected by the current sensor 110 and comparator 120, the oscillator 130 is activated such that its trigger signal may be a flat signal (of 0 Hz frequency) to turn on the switching device 140 continuously (at a relatively low load condition) or at a frequency below 1 kHz, and typically from 20 Hz to 60 Hz, to turn on and off the switching device 140 intermittently (at a relatively high load condition).

If the output current of the power supply module 100 is smaller than 5A, the switching device 140 will be turned on continuously to deliver the output current as a direct DC current. This gives rise to a conducting mode, in which the power supply module 100 delivers substantially the whole of the DC current (hence the power given that the output voltage is maintained at substantially 10.5V) supplied by the power supply unit 200 to the electric drill 300 via an appropriate conducting path established or enabled by the switching device 140.

Whenever the output current has a tendency exceeding 5A, the switching device 140 will be turned on and off intermittently to deliver the output current as a pulsating DC current whose peak magnitude is maintained at 5A. The condition will last for as long as the tendency sustains. This gives rise to a switching mode, in which the power supply module 100 delivers only part of the DC current supplied by the power supply unit 200 onto the electric drill 300. As soon as the tendency disappears, the switching device 140 will be turned continuously on again to conduct and output a direct DC current.

The switching mode will be automatically activated when there is a tendency for the output current of the power supply module 100 to exceed 5A, whereupon the module 100 will supply a pulsating DC current to the motor 310. During this process, after the switching device 140 has been turned off to disconnect the module 100 from the motor 310, the output current will suddenly drop to zero. Once the output current drops to zero, the switching device 140 will be turned on again to deliver power to the motor 310 for a short period of time. The switching device 140 will be turned on and off in repeated cycles until the output current falls back continuously below 5A, for example when the electric drill 300 is running at a no-load condition or after it has been switched off.

The current comparator 120 is also able to determine the magnitude of the high-load condition by detecting the rate at which the output current tends to increase above 5A. In response, the comparator 120 will generate a trigger signal for switching the switching device 140 at a frequency that depends upon, i.e. increases or decreases with, the rate of increase of the output current.

Figure 4A:
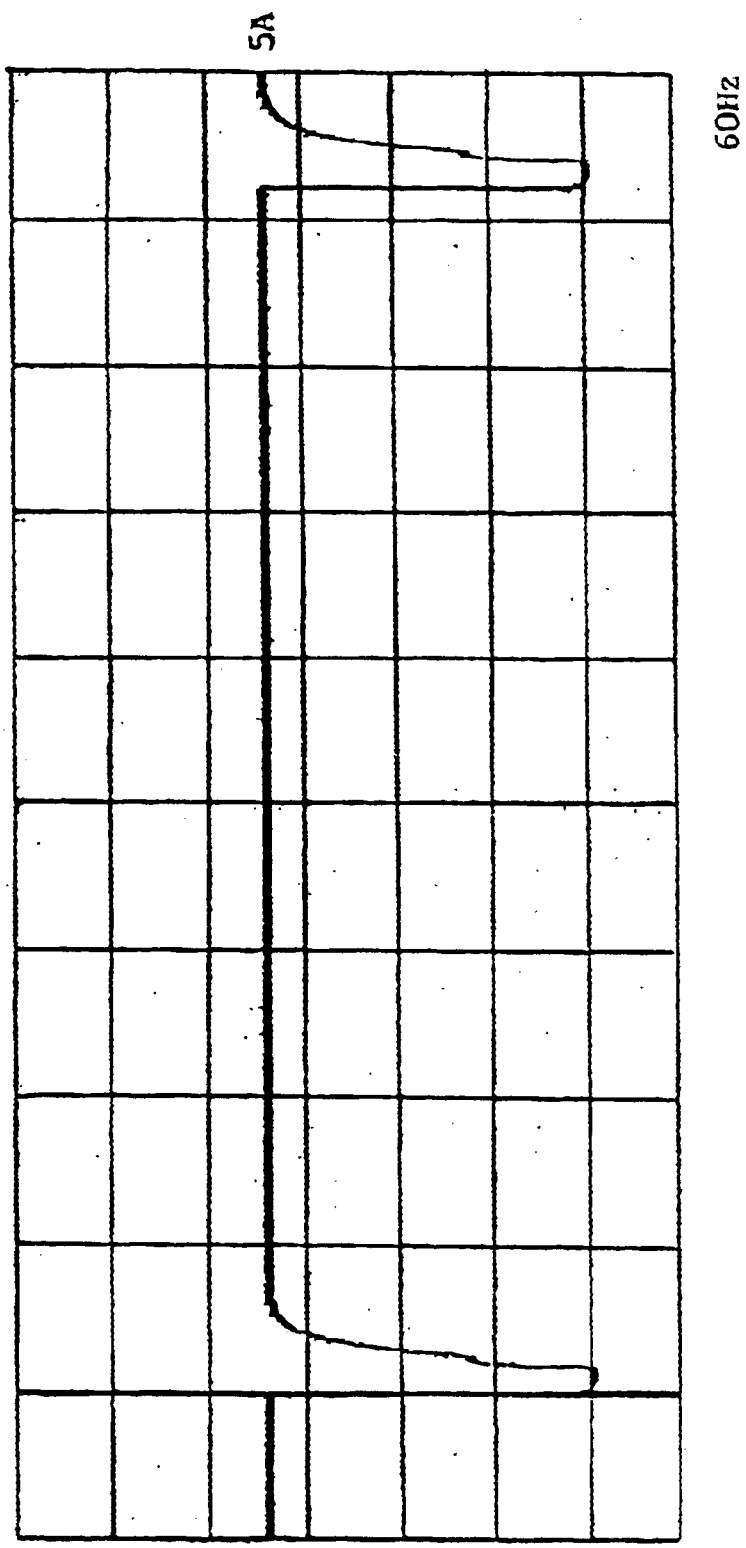
FIGS. 4A and 4B are different waveform diagrams of the output current of the power supply module of FIG. 2.
Figure 4B:
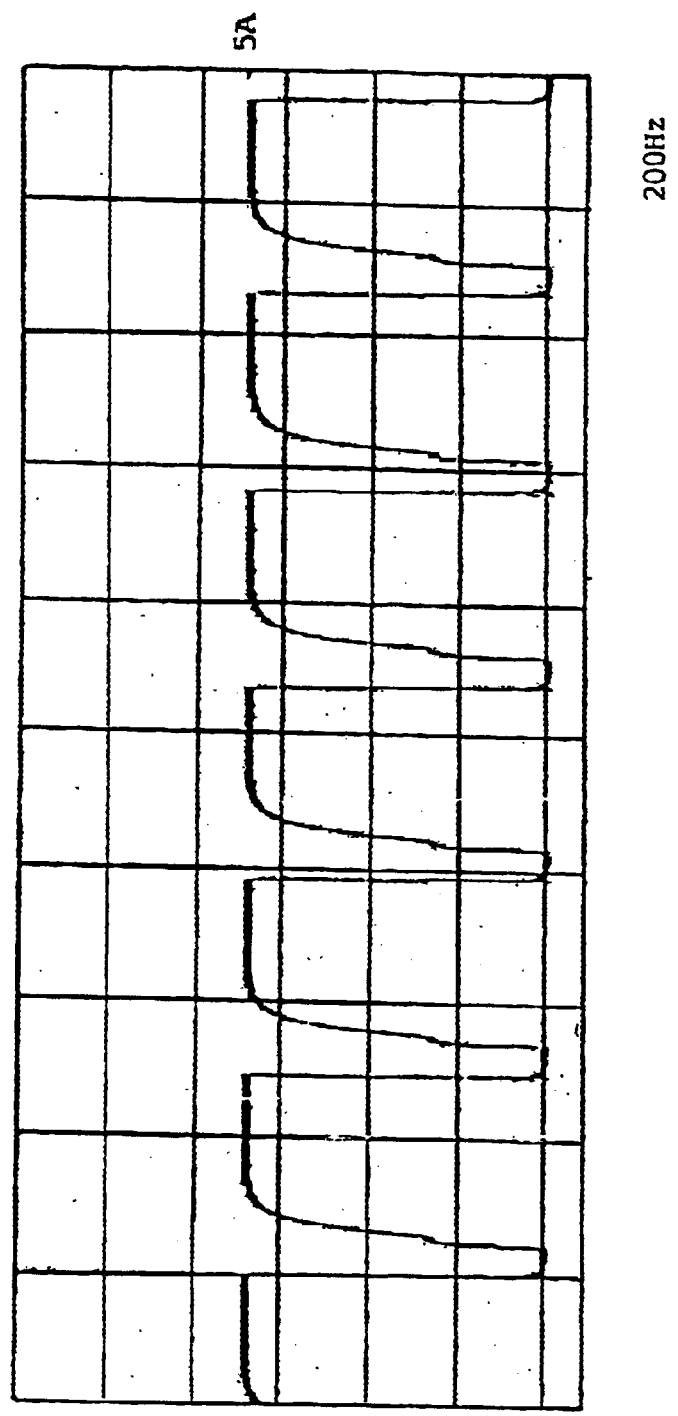

For a high-load condition equivalent to an output current of 6A, the trigger signal frequency is about 60 Hz, which results in a pulsating DC output current having a waveform as shown in FIG. 4A. For a heavier high-load condition equivalent to an output current of 7A, the trigger signal frequency is about 200 Hz, which results in a pulsating DC output current having a waveform as shown in FIG. 4B. Thus, the switching device 140 may be switching at a variable frequency that changes with the rate of the tendency of increase of the output current.

The current comparator 120 includes a capacitive delay element 122 (FIG. 3) at its output to delay the trigger current such that the switching device 140 will not be turned on instantly from the moment when the output current drops to zero in each cycle. The delay element 122 is formed by a series of two resistors 124 and 126 and a capacitor 128 connected in parallel with the lower resistor 126, together providing a time delay of about 1 ms.

The start-up current of the motor 320 is inherently considerably larger than the normal running current, which will be needed so that the motor 320 can start as required. The aforesaid time delay is introduced to ensure that the start-up current as needed by the motor 320 can be supplied in part by the power supply module 100 before the switching device 140 is turned off again.

In operation, the power supply module 100 acts as an auxiliary power source to supplement or assist the battery pack 320, depending on the conditions of the battery pack 320 and the load, i.e. the electric drill 300 or its motor 310.

If the battery pack 320 is flat at say 7.5V, the power supply module 100 will charge the battery pack 320 until its voltage rises close to the output voltage of the module 100, i.e. 10.5V. The charging current from the module 100 is limited to 5A maximum. As the battery pack 320 will be recharged back to its normal operating voltage (9.6V) in several seconds, the battery pack 320 will not be damaged by such a charging current.

In practice, the charging current will drop from 5A quickly to below 500 mA within 5 seconds. Afterwards, the power supply module 100 will gradually charge up the battery pack 320 until its voltage is close to 10.5V, with a correspondingly gradually reducing charging current. The module 100 is unable, nor intended, to fully charge the battery pack 320 as its output voltage is only 10.5V, which is below the operating voltage of about or over 13.0V of a standard charger for the 9.6V battery pack 320.

If the battery pack 320 has already been fully charged using a standard charger, there is no current flow from the power supply module 100 when the electric drill 300 is off, since the battery terminal voltage (13.0V) is higher than the output voltage (10.5V) of the module 100. Upon turning on of the electric drill 300, even in the no-load condition, the start-up current can be quite large and up to around 4A for example, and the voltage of the battery pack 320 will drop below the output voltage (10.5V) of the power supply module 100. The module 100 comes into operation in response, delivering say around 2~3A to the electric drill 300, depending on the design of the drill 300. This reduces the current drawn from the battery pack 320 to around 1~2A, from 4A if the module 100 were absent, which can significantly increases the usable time of the battery pack 320.

If the electric drill 300 is turned on in an on-load condition, the start-up current is normally at least 6~10A, say 10A. With the use of the power supply module 100 in this situation, the module 100 provides a current of 5A for the battery pack 320, and accordingly the battery pack 320 is only required to supply the remainder current, i.e. a reduced current of 5A. This can significantly increases the usable time of the battery pack 320.

During operation of the electric drill 300, the operating current often increases according to the load condition, which results in corresponding reduction of the terminal voltage of the battery pack 320. Whenever the battery voltage drops below the output voltage (10.5V) of the power supply module 100, the module 100 will automatically come into operation and share the load with the battery pack 320. The module 100 will supply a DC output current that is limited to 5A and will not normally last for too long, say only several seconds in practice.

The power supply module 100 has a switching frequency below 1 kHz, which is sufficiently low to warrant a compact size and low production cost for the module 100 and can protect the power tool 300 and the battery pack 320 and also the AC/DC power supply unit 200.

In this particular embodiment, the battery pack 320 has a nominal operating voltage of 9.6V and the output voltage of the power supply module 100 is chosen to be 5A according to the specific design of the hand drill 300 and battery pack 320. It should be noted that the subject power supply module is applicable for use with any electrical (motor driven) power tools of powered by rechargeable battery packs of different power rating.

Figure 5:
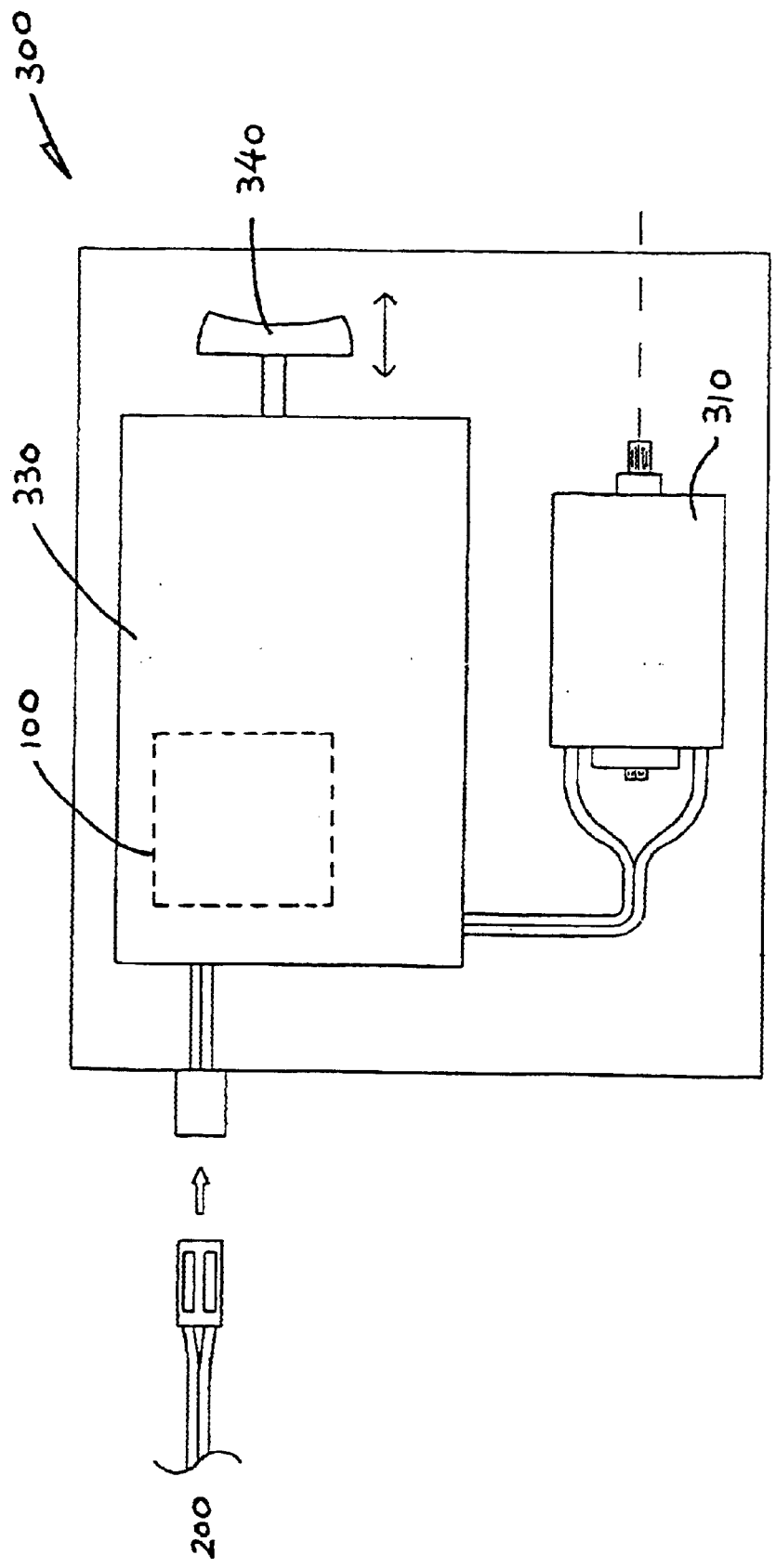
FIG. 5 is a schematic block diagram of the power supply module of FIGS. 1 and 2 incorporated in a trigger control circuit of the power tool.
Figure 6:
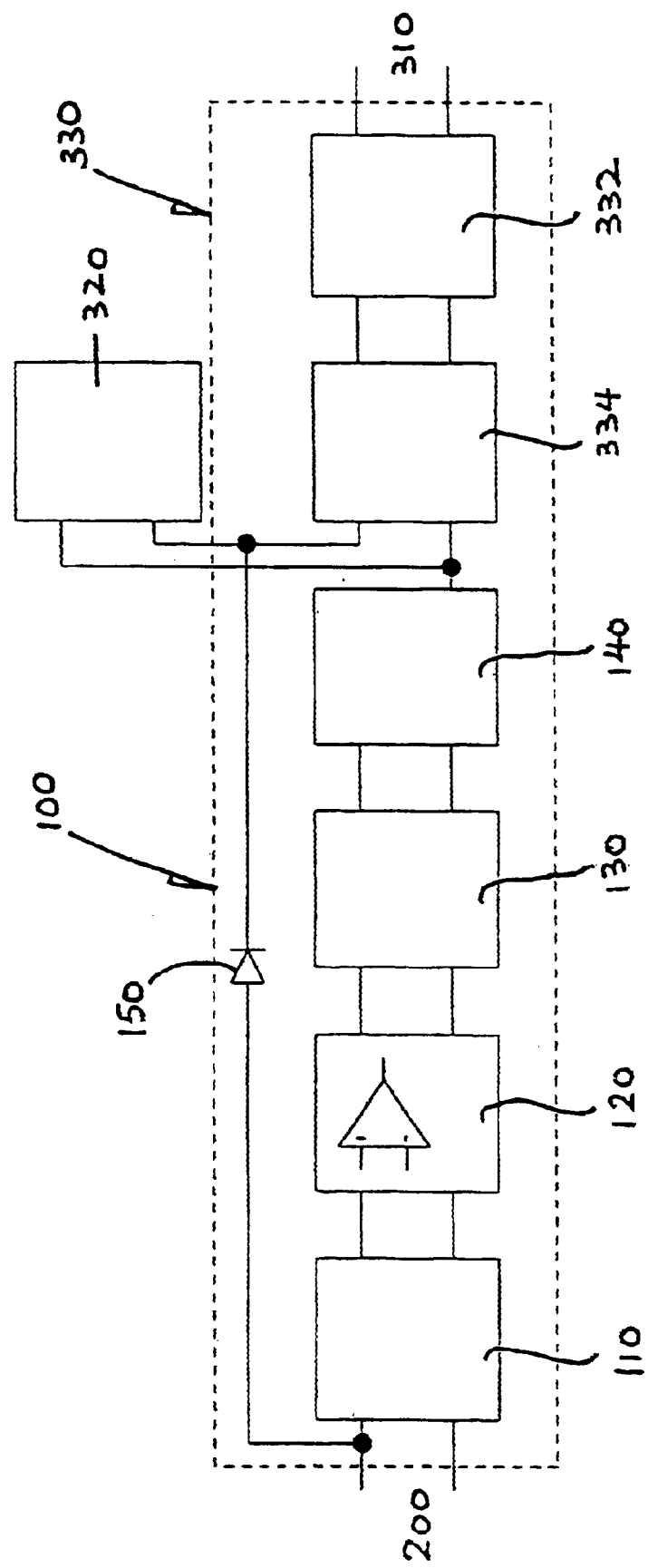
FIG. 6 is a functional block diagram of the power supply module and trigger control circuit of FIG. 5, showing also a rechargeable battery pack of the power tool.
Figure 7:
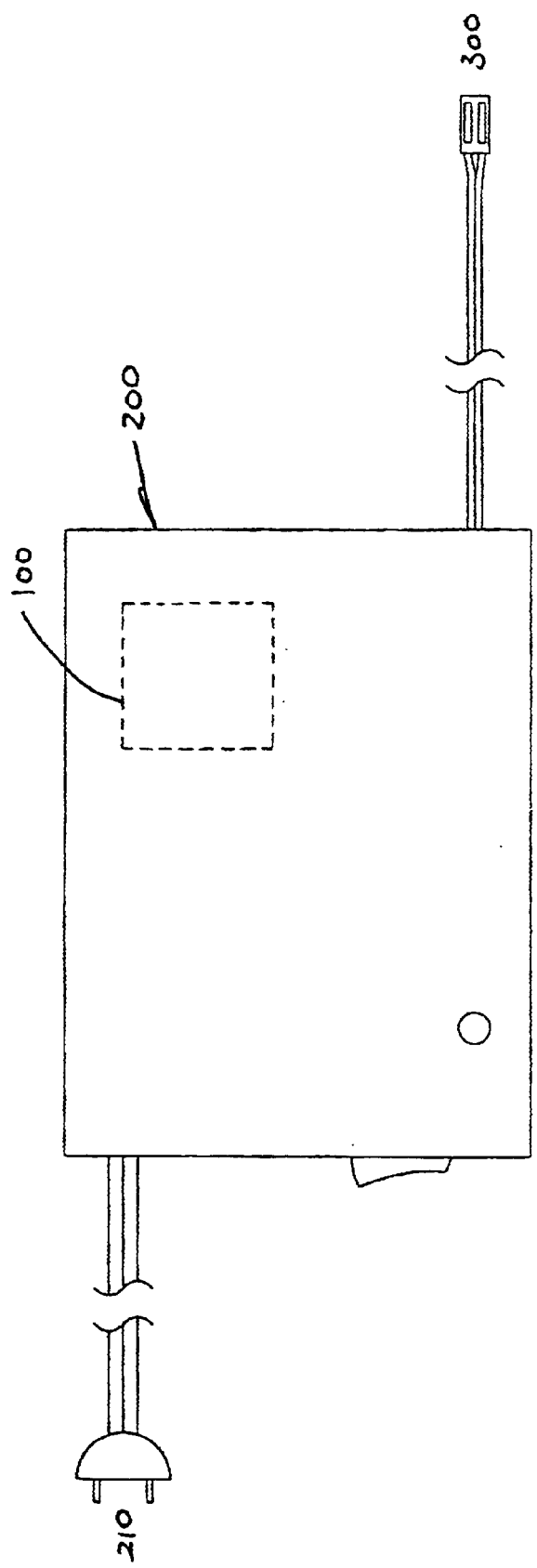
FIG. 7 is a schematic block diagram of the power supply module of FIGS. 1 and 2 incorporated in the AC/DC power supply unit.
Figure 8:
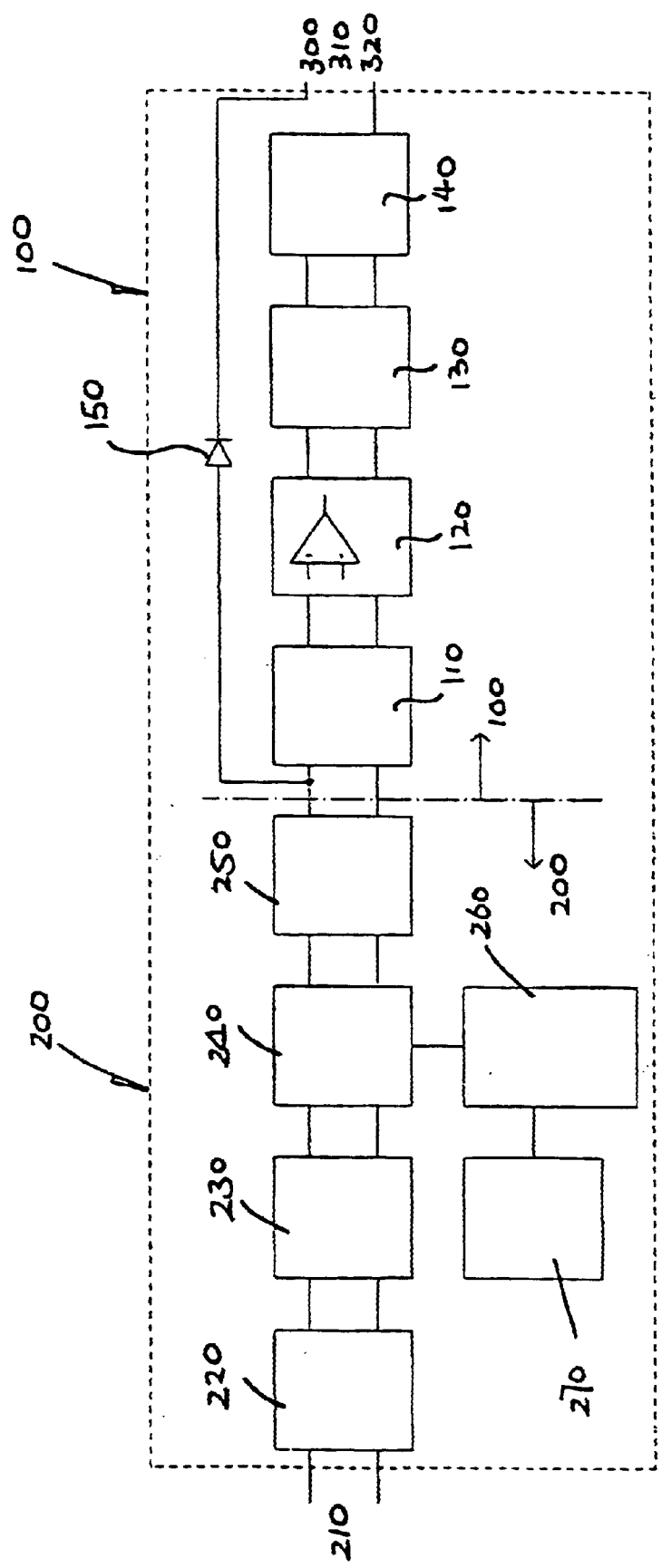
FIG. 8 is a functional block diagram of the power supply module and AC/DC power supply unit of FIG. 5.

The power supply module 100 may be manufactured as a stand-alone product, or integrated with or built-in within either the power tool 300 as shown in FIGS. 5 and 6 or the AC/DC power supply unit 200 as shown in FIGS. 7 and 8.

In FIGS. 5 and 6, the trigger control circuit 330 is operable to switch on and off and to control the speed of the motor 310, as described in United Kingdom Patent No. 2 314 980, the disclosure of which is hereby incorporated by reference. The control circuit 330 includes a MOSFET transistor 332 for switching the power supplied by the battery pack 320 to the motor 310 to control the motor speed, and a time controller 334 connected to the transistor 332 for providing an oscillating trigger signal thereto.

The power supply module 100 is connected at its output 103/104 to the time controller 334 of the trigger control circuit 330, to which the battery pack 320 is also connected such that the module 100 and the pack 320 are connected together in parallel. The module 100 and the control circuit 330 are mounted on the same printed circuit board.

In FIGS. 7 and 8, the AC/DC power supply unit 200 generally comprises a noise and/or EMC filter 220, a rectifier and capacitor reservoir (high voltage) 230, a MOSFET switching device and switching/isolating transformer 240 and a rectifier and capacitor reservoir (low voltage) 240, all being connected together in series across the input and output of the unit 200. The supply unit 200 includes a high frequency (>30 kHz) generator 260 (for pulse width or frequency modulation) connected to the MOSFET switching device and switching/isolating transformer 240, and an over-current and constant voltage sensor 270 connected to the generator 26b for controlling the same. The rectifier and capacitor reservoir (low voltage) 240 acts an output that is connected to the input 101/102 of the power supply module 100, for supplying a DC power to the module 100.

The power supply unit 200 is an AC-to-DC switching mode power supply, whose specific construction and detailed operation are generally known in the art and will not be described herein.

The invention has been given by way of example only, and various modifications and/or variations to the described embodiment may be made by persons skilled in the art without departing from the scope of the invention as specified in the accompanying claims.

What is claimed is:

1. A power supply module for use between an AC/DC power supply unit and an electrical power tool driven by an electric motor and powered by a rechargeable battery pack having a normal operating voltage and a relatively higher fully-charged terminal voltage, the power supply module comprising:
    an input connectable to a power supply unit and an output connectable, in parallel, to a battery pack; and
    an operating circuit connected between the input and the output for delivering DC power from the power supply unit to the power tool in parallel with the battery pack supplying DC power to the power tool, said operating circuit providing a DC operating voltage at the output between a normal operating voltage and a fully-charged terminal voltage of the battery pack, and providing an output current limited to a predetermined magnitude, said operating circuit comprising:
        a current comparator for determining whether the output current is less than or is increasing toward exceeding the predetermined magnitude and providing a corresponding first control signal, and
        a switching device connected at the output for controlling, in response to the first control signal, the power delivered to the power tool as a direct DC current when the output current is below the predetermined magnitude and as a pulsating DC current when the output current is increasing toward exceeding the predetermined magnitude.

2. The power supply module as claimed in claim 1, wherein the operating circuit includes a current sensor connected between the input and the current comparator for sensing the current drawn into and output by the module and sending a second control signal, indicative of the magnitude of the output current to the current comparator, the current comparator subsequently comparing the second control signal with a predetermined value that represents the predetermined magnitude.

3. The power supply module as claimed in claim 2, wherein the operating circuit includes an oscillator connected between the current comparator for receiving the control signal and the switching device for providing a trigger signal for controlling, in response to the first control signal, the power delivered to the power tool.

4. The power supply module as claimed in claim 3, wherein the trigger signal provided by the oscillator has a frequency below 1 kHz.

5. The power supply module as claimed in claim 3, wherein the current comparator determines a rate at which the output current is increasing toward the predetermined magnitude and, in response, controls the oscillator to provide the trigger signal for switching the switching device at a frequency that increases or decreases with the rate at which the output current is increasing.

6. The power supply module as claimed in claim 1, wherein the operating circuit provides a substantially constant DC operating voltage at the output.

7. The power supply module as claimed in claim 1, wherein the DC operating voltage provided by the operating circuit is 25% higher than the normal operating voltage of the battery pack.

8. The power supply module as claimed in claim 7, wherein the DC operating voltage provided by the operating circuit is approximately 10% higher than the normal operating voltage of the battery pack.

9. The power supply module as claimed in claim 1, wherein the first control signal controls the switching device to deliver power to the power tool as a pulsating DC current having a peak magnitude substantially at the predetermined magnitude.

10. The power supply module as claimed in claim 1, wherein the operating circuit includes a delay element to delay the first control signal in turning on the switching device while delivering power to the power tool as a pulsating DC current.

11. The power supply module as claimed in claim 1, wherein the control signal turns on the switching device continuously and, in turn, delivers substantially all of the current supplied by the power supply unit to the power tool as a direct DC current.

12. The power supply module as claimed in claim 1, wherein each of the input and output has a pair of terminals, and the operating circuit includes a unidirectional conducting element connected from one of the input terminals to one of the output terminals for blocking flow of reverse current from the output terminal to the input terminal.

13. The power supply module as claimed in claim 12, wherein the unidirectional conducting element comprises a diode.

14. An electrical power tool driven by an electric motor and powered by a rechargeable battery pack, incorporating a power supply module, wherein the power tool includes a trigger control circuit connected between the battery pack and the motor, and the control circuit incorporates a trigger for switching on and off and controlling speed of the motor, and the module is connected at an output in parallel with the battery pack as an auxiliary power source to assist the battery pack, the power supply module comprising:
    an input connectable to the power supply unit and the output connectable, in parallel, to a battery pack; and
    an operating circuit connected between the input and the output for delivering DC power from the power supply unit to the power tool in parallel with said battery pack supplying DC power to the power tool, said operating circuit providing the DC operating voltage at the output between a normal operating voltage and a fully-charged terminal voltage of the battery pack, and providing an output current limited to a predetermined magnitude, said operating circuit comprising:
        a current comparator for determining whether the output current is less than or is increasing toward exceeding the predetermined magnitude and providing a corresponding control signal, and a switching device connected at the output for controlling, in response to the control signal, the power delivered to the power tool as a direct DC current when the output current is below the predetermined magnitude and as a pulsating DC current when the output current is increasing toward exceeding the predetermined magnitude.

15. An AC/DC power supply unit incorporating a power supply module comprising:

an input connectable to the power supply unit and an output connectable, in parallel, to a battery pack; and an operating circuit connected between the input and the output for delivering DC power from the power supply unit to the power tool in parallel with said battery pack supplying DC power to the power tool, said operating circuit providing a DC operating voltage at the output between a normal operating voltage and a filly-charged terminal voltage of the battery pack, and providing an output current limited to a predetermined magnitude, said operating circuit comprising:

a current comparator for determining whether the output current is less than or is increasing toward exceeding the predetermined magnitude and providing a corresponding control signal, and a switching device connected at the output for controlling, in response to the control signal, the power delivered to the power tool as a direct DC current when the output current is below the predetermined magnitude and as a pulsating DC current when the output current is increasing toward exceeding the predetermined magnitude, wherein the power supply unit is an AC-to-DC switching mode power supply having the output connected to the input of the power supply module for supplying DC power to the power supply module, the power supply unit and the power supply module having substantially the same operating voltages.

* * * * *